United States Patent
Rozas et al.

(10) Patent No.: US 9,081,563 B2
(45) Date of Patent: *Jul. 14, 2015

(54) METHOD AND APPARATUS FOR ENHANCING SCHEDULING IN AN ADVANCED MICROPROCESSOR

(76) Inventors: Guillermo J. Rozas, Los Gatos, CA (US); Godfrey P. D'Souza, San Jose, CA (US); Charles R. Price, Sunnyvale, CA (US); Paul S. Serris, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/488,138

(22) Filed: Jun. 4, 2012

(65) Prior Publication Data
US 2012/0246453 A1  Sep. 27, 2012

Related U.S. Application Data (63) Continuation of application No. 10/783,473, filed on Feb. 20, 2004, now Pat. No. 8,209,517, which is a continuation of application No. 09/332,338, filed on Jun. 14, 1999, now Pat. No. 7,089,404.

(51) Int. Cl.
*G06F 9/30* (2006.01)
*G06F 9/40* (2006.01)
*G06F 9/38* (2006.01)

(52) U.S. Cl.
CPC .......... *G06F 9/30174* (2013.01); *G06F 9/3808* (2013.01); *G06F 9/3834* (2013.01); *G06F 9/3836* (2013.01); *G06F 9/3863* (2013.01)

(58) Field of Classification Search
CPC .............................. G06F 9/3836; G06F 9/3865
USPC ............ 712/210, 23, 216; 717/137; 711/167, 711/156; 714/38.1
See application file for complete search history.

(56) References Cited

U.S. PATENT DOCUMENTS

| | | | |
|---|---|---|---|
| 4,766,566 | A | 8/1988 | Chuang |
| 4,817,118 | A | 3/1989 | Wilburn et al. |
| 4,903,264 | A | 2/1990 | Talgam |
| 5,253,349 | A | 10/1993 | Kreitzer |
| 5,269,017 | A | 12/1993 | Hayden et al. |
| 5,274,815 | A | 12/1993 | Trissel et al. |
| 5,349,658 | A | 9/1994 | O'Rourke et al. |
| 5,420,990 | A | 5/1995 | McKeen et al. |
| 5,421,022 | A | 5/1995 | McKeen et al. |
| 5,450,560 | A | 9/1995 | Bridges et al. |

(Continued)

FOREIGN PATENT DOCUMENTS

| | | |
|---|---|---|
| GB | 2324181 | 10/1998 |
| WO | 98/28689 | 7/1998 |

OTHER PUBLICATIONS

Intel Corporation, "i486 Microprocessor," pp. 1-175, Apr. 1, 1989.

(Continued)

*Primary Examiner* — Dustin Nguyen (57) ABSTRACT

Apparatus and a method for causing scheduler software to produce code which executes more rapidly by ignoring some of the normal constraints placed on its scheduling operations and simply scheduling certain instructions to run as fast as possible, raising an exception if the scheduling violates a scheduling constraint, and determining steps to be taken for correctly executing each set of instructions about which an exception is raised.

17 Claims, 7 Drawing Sheets

(56) References Cited

U.S. PATENT DOCUMENTS

| | | | |
|---|---|---|---|
| 5,454,117 A | 9/1995 | Puziol et al. | |
| 5,463,745 A | 10/1995 | Vidwans et al. | |
| 5,467,473 A | 11/1995 | Kahle et al. | |
| 5,511,175 A | 4/1996 | Favor et al. | |
| 5,519,841 A | 5/1996 | Sager et al. | |
| 5,526,499 A | 6/1996 | Bernstein et al. | |
| 5,537,559 A | 7/1996 | Kane et al. | |
| 5,537,620 A | 7/1996 | Breternitz, Jr. | |
| 5,542,075 A | 7/1996 | Ebcioglu et al. | |
| 5,546,599 A | 8/1996 | Song | |
| 5,548,738 A | 8/1996 | Song | |
| 5,557,763 A | 9/1996 | Senter et al. | |
| 5,559,976 A | 9/1996 | Song | |
| 5,590,295 A | 12/1996 | Deosaran et al. | |
| 5,596,390 A | 1/1997 | Sawada | |
| 5,606,670 A | 2/1997 | Abramson et al. | |
| 5,625,835 A * | 4/1997 | Ebcioglu et al. | 712/23 |
| 5,625,837 A | 4/1997 | Popescu et al. | |
| 5,627,981 A | 5/1997 | Adler et al. | |
| 5,655,098 A * | 8/1997 | Witt et al. | 712/210 |
| 5,689,712 A | 11/1997 | Heisch | |
| 5,694,577 A * | 12/1997 | Kiyohara et al. | 711/167 |
| 5,751,983 A | 5/1998 | Abramson et al. | |
| 5,754,812 A | 5/1998 | Favor et al. | |
| 5,790,625 A | 8/1998 | Arimilli | |
| 5,802,588 A * | 9/1998 | Ramagopal et al. | 711/156 |
| 5,809,273 A | 9/1998 | Favor et al. | |
| 5,832,205 A | 11/1998 | Kelly et al. | |
| 5,864,692 A | 1/1999 | Faraboschi et al. | |
| 5,875,340 A | 2/1999 | Quarnstrom et al. | |
| 5,901,308 A | 5/1999 | Cohn et al. | |
| 5,903,749 A | 5/1999 | Kenner et al. | |
| 5,918,005 A * | 6/1999 | Moreno et al. | 714/38.1 |
| 5,920,710 A | 7/1999 | Tan et al. | |
| 5,931,957 A | 8/1999 | Konigsburg et al. | |
| 5,987,595 A | 11/1999 | Yoaz et al. | |
| 5,996,060 A | 11/1999 | Mendelson et al. | |
| 6,011,908 A | 1/2000 | Wing et al. | |
| 6,031,992 A | 2/2000 | Cmelik et al. | |
| 6,065,115 A | 5/2000 | Sharangpani et al. | |
| 6,141,742 A | 10/2000 | Favor | |
| 6,148,394 A | 11/2000 | Tung et al. | |
| 6,173,366 B1 | 1/2001 | Thayer et al. | |
| 6,185,668 B1 | 2/2001 | Arya | |
| 6,189,088 B1 * | 2/2001 | Gschwind | 712/216 |
| 6,192,465 B1 | 2/2001 | Roberts | |
| 6,202,204 B1 | 3/2001 | Wu et al. | |
| 6,216,200 B1 | 4/2001 | Yeager | |
| 6,463,523 B1 | 10/2002 | Kessler et al. | |
| 6,505,296 B2 | 1/2003 | Morris et al. | |
| 6,609,189 B1 | 8/2003 | Kuszmaul et al. | |
| 6,631,514 B1 * | 10/2003 | Le | 717/137 |
| 6,704,861 B1 | 3/2004 | McKeen et al. | |
| 2003/0177340 A1 | 9/2003 | Janik et al. | |

OTHER PUBLICATIONS

Gallagher, David et al., "Dynamic Memory Disambiguation Using the Memory Conflict Buffer", ASPLOS-VI Proceedings, Oct. 1994, pp. 1-13.

* cited by examiner

METHOD AND APPARATUS FOR ENHANCING SCHEDULING IN AN ADVANCED MICROPROCESSOR

CROSS-REFERENCE TO RELATED APPLICATIONS

This application is a Continuation of and claims priority to U.S. patent application Ser. No. 10/783,473, filed on Feb. 20, 2004 and now issued as U.S. Pat. No. 8,209,517, which is a Continuation of and claims priority to U.S. patent application Ser. No. 09/332,338, filed on Jun. 14, 1999, now issued as U.S. Pat. No. 7,089,404, which are hereby incorporated by reference in their entirety.

FIELD

Embodiments relate to computer systems. More particularly, embodiments relate to methods and apparatus for accelerating the reordering of instructions in an improved microprocessor.

BACKGROUND

Recently, a new microprocessor was developed which combines a simple but very fast host processor (called "morph host") and software (called "code morphing software") to execute application programs designed for a processor different than the morph host processor at a rate which cannot be attained by the processor for which the programs were designed (the target processor). The morph host processor executes the code morphing software to translate the application programs into morph host processor instructions which accomplish the purpose of the original target software. As the target instructions are translated, they are both executed and stored in a translation buffer where they may be accessed without further translation. Although the initial translation and execution of a program is slow, once translated, many of the steps normally required to execute a program in hardware are eliminated.

In order to be able to execute programs designed for other processors at a rapid rate, the morph host processor includes a number of hardware enhancements. One of these enhancements is a gated store buffer which resides between the host processor and the translation buffer. A second enhancement is a set of host registers which store state of the target machine at the beginning of any sequence of target instructions being translated. Sequences of target instructions spanning known states of the target processor are translated into morph host instructions and placed in the translation buffer awaiting execution. If the translated instructions execute without raising an exception, the target state at the beginning of the sequence of instructions is updated to the target state at the point at which the sequence completed.

If an exception occurs during the execution of the sequence of host instructions which have been translated, the processing stops; and the entire operation may be returned or rolled back to the beginning of the sequence of target instructions at which known state of the target machine exists. This allows very rapid and accurate handling of exceptions while dynamically translating and executing instructions, a result which had never been accomplished by the prior art.

Additional speed is attained in running the new microprocessor by a scheduler which is part of the code morphing software. The scheduler reorders and reschedules the instructions as they are being translated from a naive order produced by raw translation into an order which produces the same result but allows faster execution. A scheduler attempts to place certain instructions ahead of other instructions or to run instructions together so that the execution of the rescheduled software takes less time. Schedulers function with a number of constraints the most basic of which is that the rescheduled program must still produce the same ultimate results as the original program. As an example, there are sequences of instructions in programs which must be carried out without interruption in order for the sequences to produce the correct results. A scheduler cannot interfere with such sequences without interfering with the results produced. Many processors provide hardware interlocks to assure that such sequences are, in fact, run without interruption. The need to protect such sequences of instructions poses special constraints for processors without hardware interlocks such as the advanced morph host processor being discussed. Software must somehow be aware of such sequences and assure that they are run without interruption.

Control dependencies are another traditional constraint on reordering which a scheduler faces. Control dependencies relate to branch instructions; a scheduler must assure that reordering of instructions which occur before and after a branch do not cause the program to run incorrectly.

Other dependencies affect the reordering of loads with respect to stores. For example, if updated data is to be stored to a memory address and then manipulated in a register operation, the data at the address should not be kept in a register at the time the store occurs or the data in the register may be stale.

All of these constraints cause a typical scheduler to function very conservatively and, consequently, to produce slower code.

A traditional scheduler does its best to determine those instructions which depend on one another in order to accomplish reordering. The usual scheduler can determine that some operations depend on other operations in some way and that some operations do not depend on other operations in any way, but it cannot determine anything with regard to other operations. Such a scheduler treats those operations which depend on other operations conservatively by ordering them in the normal naive order in which they originated. Such a scheduler reorders operations which do not depend on other operations at all in the manner it desires. Finally, it treats all operations about which it cannot make a determination regarding dependencies as though they depended on one another and handles them conservatively and slowly.

It is desirable to provide circuitry and software for enabling a scheduler of an advanced processor to generate code which executes at an accelerated speed.

SUMMARY

Embodiments are realized by apparatus and a method for causing scheduler software to produce code which executes more rapidly by ignoring some of the normal constraints placed on scheduling operations and simply scheduling certain instructions to run as fast as possible, raising an exception if the scheduling violates a scheduling constraint, and determining steps to be taken for each set of instructions about which an exception is raised.

These and other objects and features will be better understood by reference to the detailed description which follows taken together with the drawings in which like elements are referred to by like designations throughout the several views.

BRIEF DESCRIPTION OF THE DRAWINGS

The accompanying drawings, which are incorporated in and form a part of this specification, illustrate embodiments and, together with the description, serve to explain the principles of the disclosure.

DETAILED DESCRIPTION

Reference will now be made in detail to embodiments, examples of which are illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of embodiments, numerous specific details are set forth in order to provide a thorough understanding of the disclosure. However, it will be recognized by one of ordinary skill in the art that the disclosure may be practiced without these specific details. In other instances, well-known methods, procedures, components, and circuits have not been described in detail as not to unnecessarily obscure aspects of the embodiments.

Figure 1:
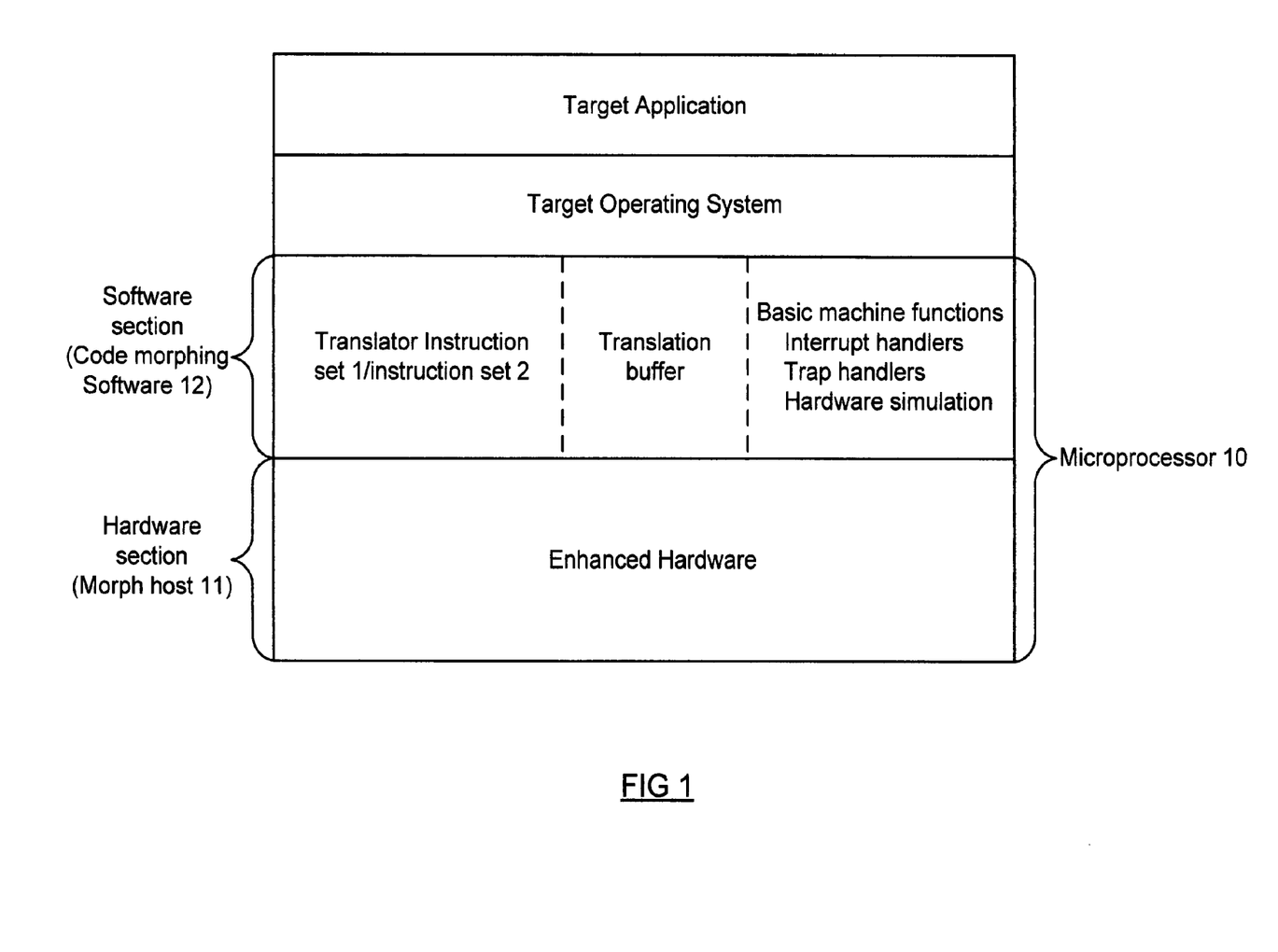
FIG. 1 is a diagram illustrating a new microprocessor which may utilize embodiments of the disclosure.

FIG. 1 illustrates a new microprocessor 10 which combines an enhanced hardware processing portion (referred to as a "morph host") which is much simpler than state of the art microprocessors and an emulating software portion (referred to as "code morphing software"). The two portions function together to carry out the operations normally accomplished by hardware alone in an advanced microprocessor. The new microprocessor 10 is faster than microprocessors of the prior art, is capable of running all of the software for all of the operating systems which may be run by a large number of families of prior art microprocessors, yet is less expensive than prior art microprocessors.

Figure 2:
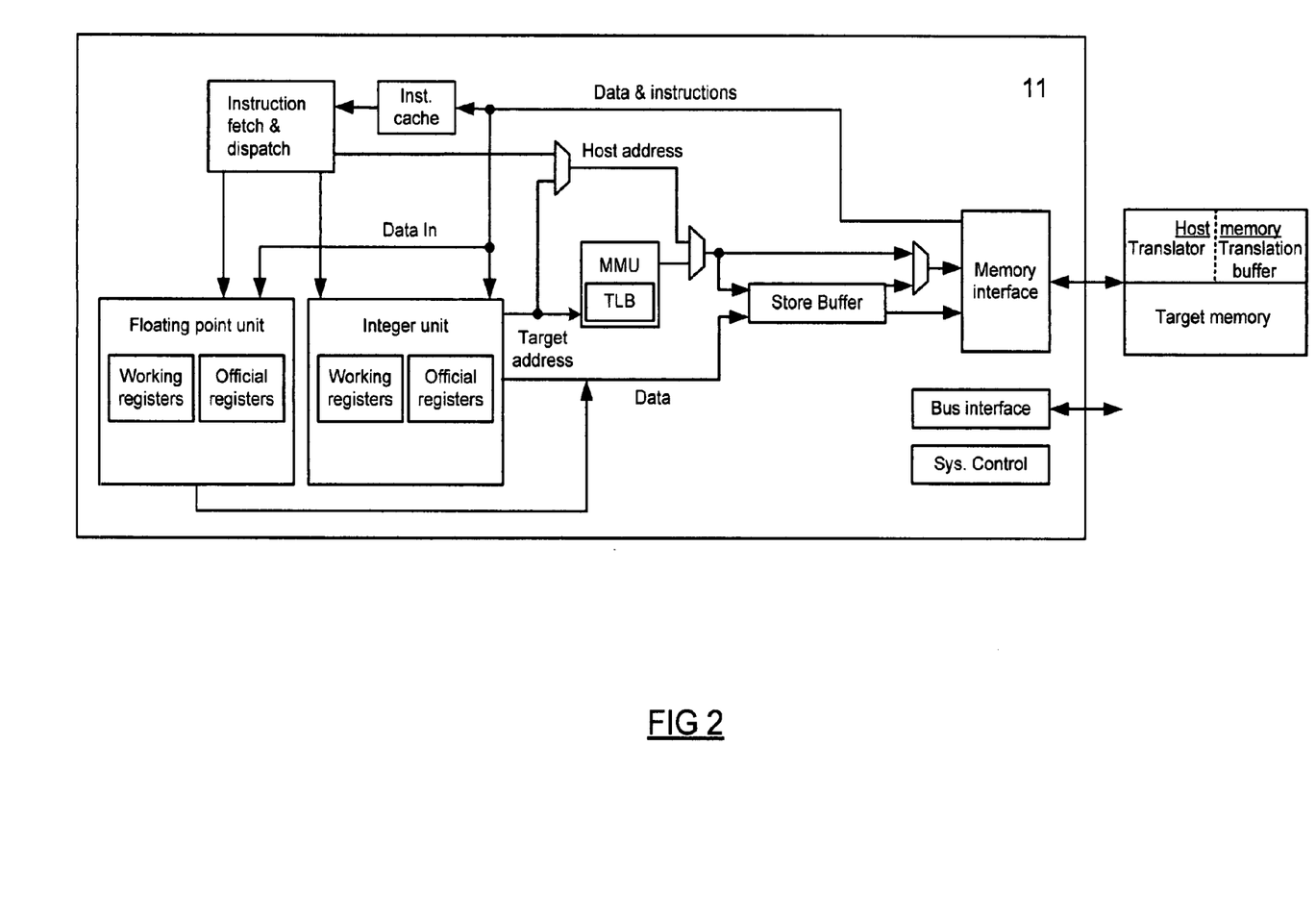
FIG. 2 is a block diagram of hardware for implementing the new microprocessor of FIG. 1.

The microprocessor 10 includes a morph host processor 11 designed to execute code morphing software 12 for executing application programs designed for a different target processor. The morph host 11 includes hardware enhancements especially adapted to allow the acceleration techniques provided by the code morphing software 12 to be utilized efficiently. The morph host processor includes hardware enhancements to assist in accelerating operations and in providing state of a target computer immediately when an exception or error occurs. The code morphing software includes software which, among other things, translates the instructions of a target program to morph host instructions, schedules and instructions, and responds to exceptions and errors when necessary by rolling back execution to the last point at which execution is known to have been correct and replacing working state with correct target state at that point so that correct retranslations of target code may occur. Code morphing software also includes various processes for enhancing the speed of processing. The block diagram of FIG. 2 illustrates in detail exemplary hardware of a morph host 11 which implements the features discussed herein.

Figure 3:
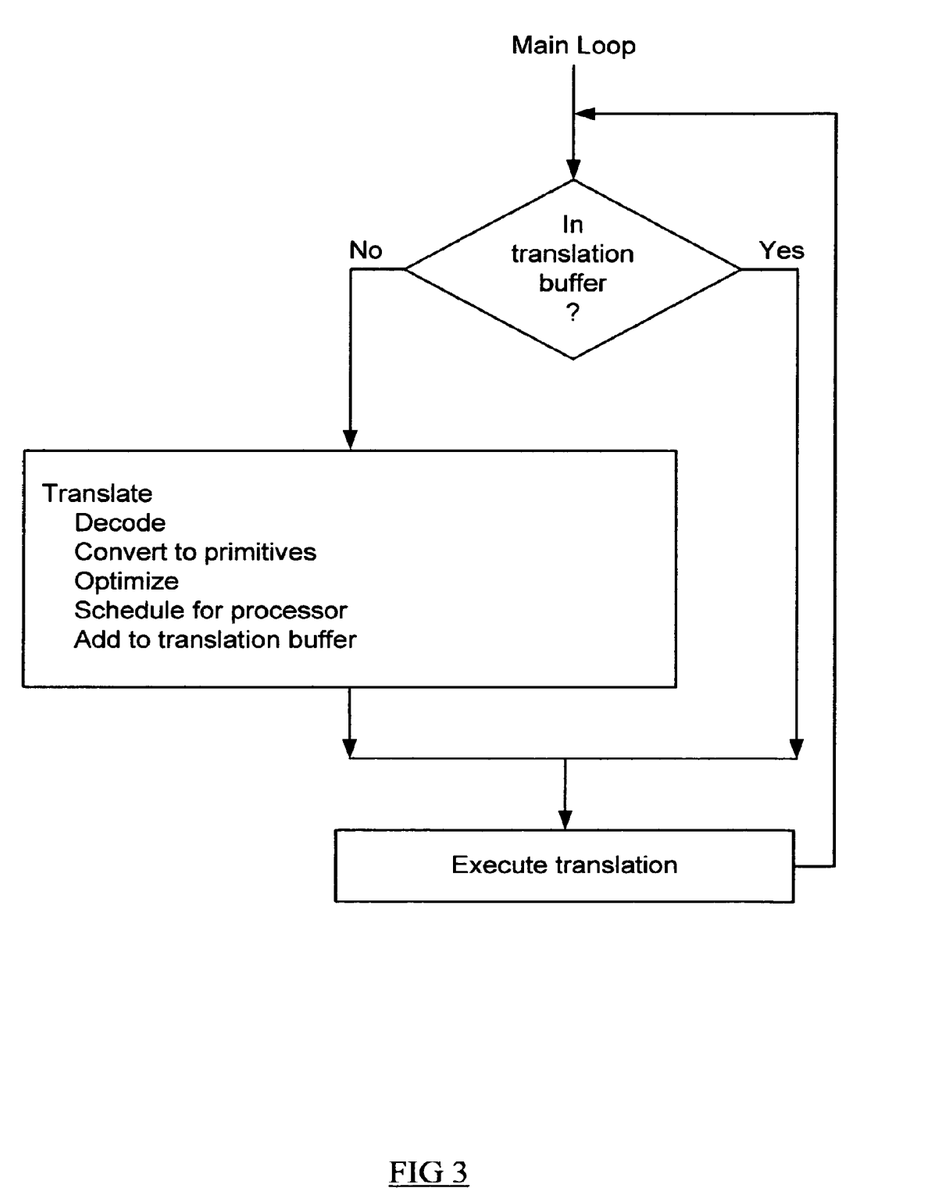
FIG. 3 is a flow chart illustrating a main processing loop of the new processor of FIG. 1.

As is illustrated in the diagram of FIG. 3 (which describes the operation of the main loop of the code morphing software 12), the code morphing software combined with the enhanced morph host translates target instructions into instructions for the morph host on the fly and caches those host instructions in a memory data structure (referred to as a "translation buffer"). Once a target instruction has been translated, it may be recalled from the translation buffer and executed without the need for any of the myriad of steps required by prior art hardware microprocessors such as: determining which primitive instructions are required to implement each target instruction, addressing each primitive instruction, fetching each primitive instruction, optimizing the sequence of primitive instructions, allocating assets to each primitive instruction, reordering the primitive instructions, and executing each step of each sequence of primitive instructions involved each time each target instruction is executed.

A primary problem of prior art emulation techniques has been the inability to handle exceptions generated during the execution of a target program with good performance. Some exceptions generated in running the target application are directed to the target operating system, and the correct target state must be available at the time of any such exception for proper execution of the exception and the instructions which follow. Other exceptions can be generated by the emulator to detect particular target operations which have been replaced by some particular host function. The host processor executing the host instructions derived from the target instructions can also generate exceptions. All of these exceptions can occur either during the attempt to change target instructions into host instructions by the emulator, or when the emulating host instructions are executed by the host processor. Exceptions directed to the target operating system are especially difficult because they require a knowledge of the state of the target processor at all times.

Figure 5:
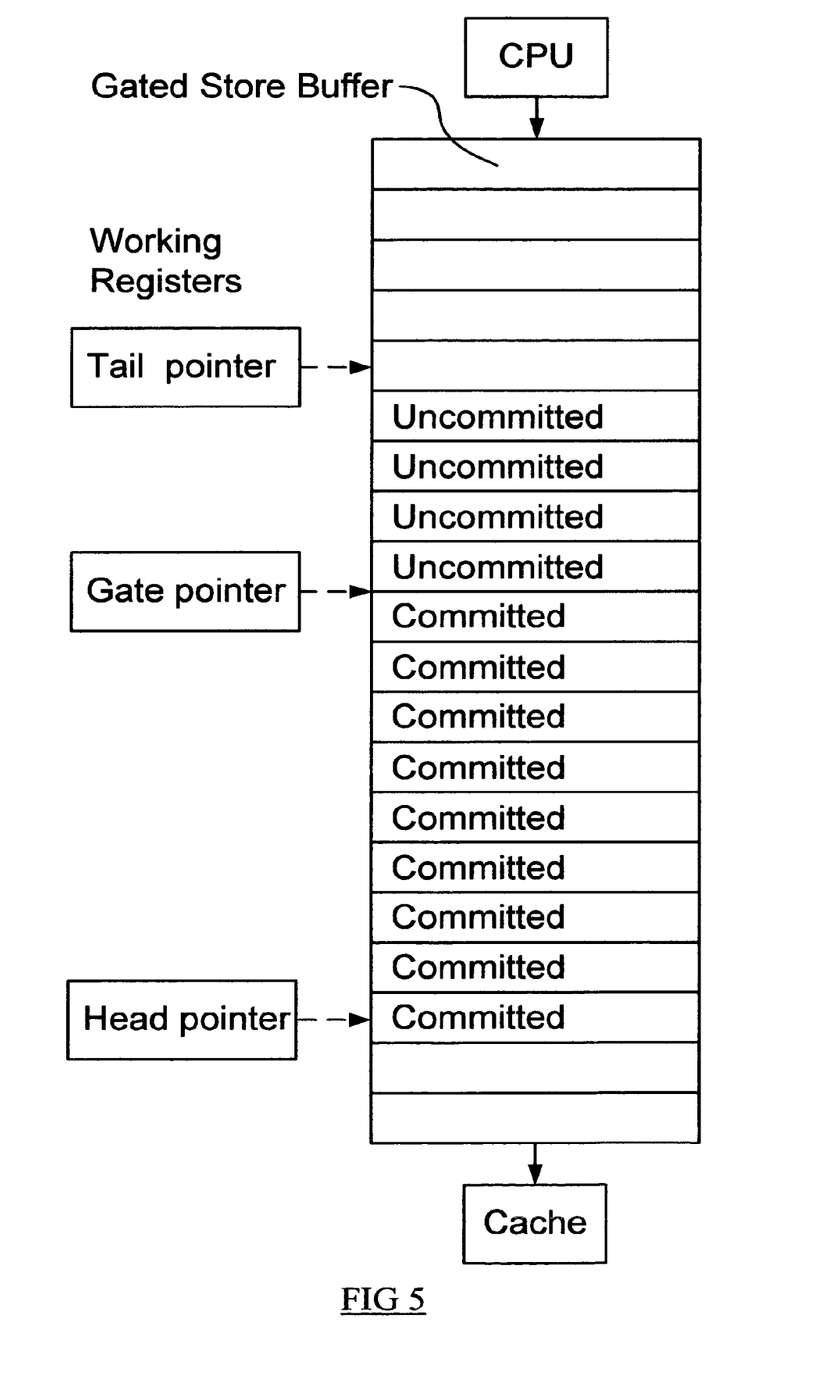
FIG. 5 is a block diagram illustrating another portion of the new processor.

In order to recover from these exceptions efficiently, the enhanced morph host includes a number of hardware improvements. These improvements include a gated store buffer (see FIG. 5). The gated store buffer stores working memory state changes on an "uncommitted" side of a hardware "gate" and official memory state changes on a "committed" side of the hardware gate where these committed stores "drain" to main memory. A "commit" operation transfers memory stores from the uncommitted side of the gate to the committed side of the gate. If an exception occurs, a "rollback" operation discards uncommitted stores in the gated store buffer.

Figure 4:
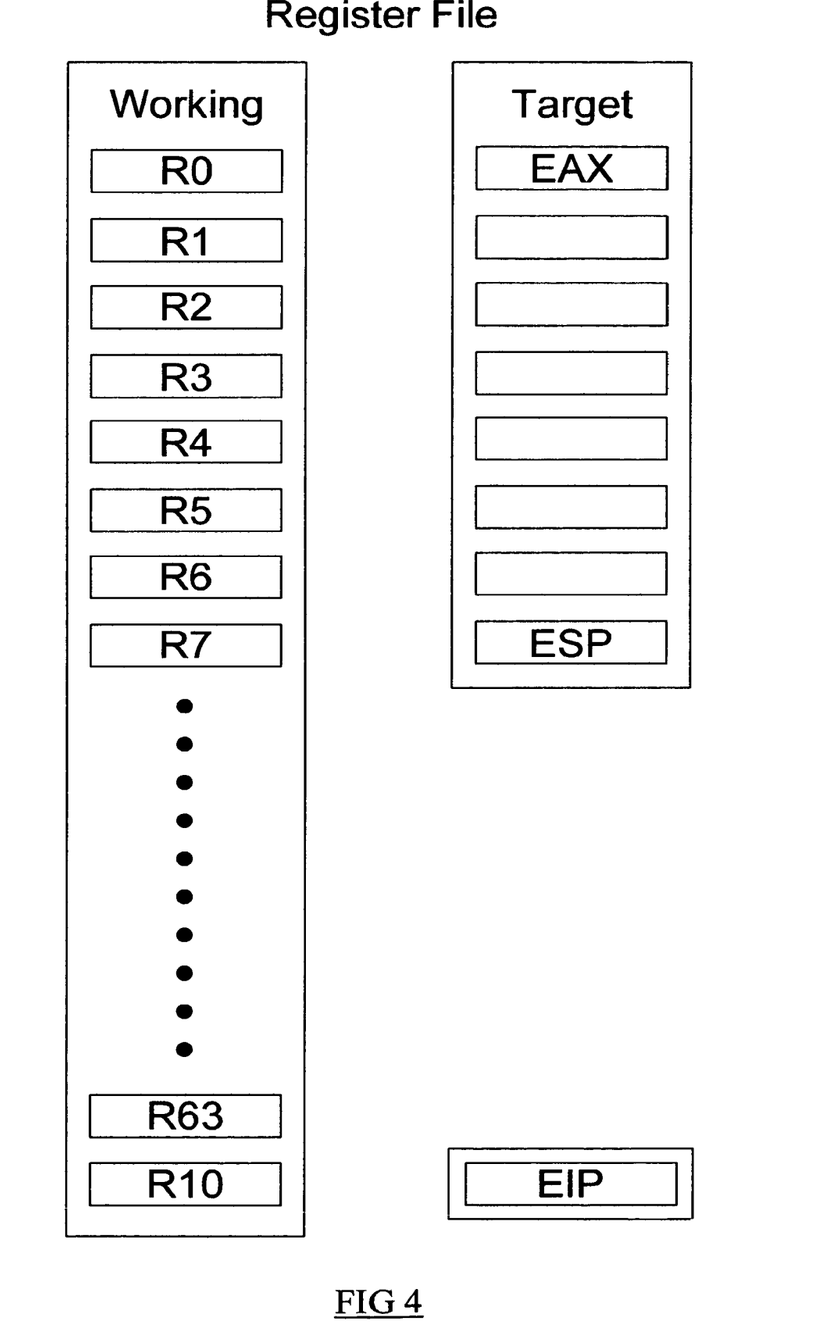
FIG. 4 is a block diagram illustrating a portion of the new processor.

The hardware improvements also include a large plurality of additional processor registers (see FIG. 4). In addition to allowing register renaming to lessen the problem of instructions trying to utilize the same hardware resources, the additional registers allow the maintenance of a set of host or working registers for processing the host instructions and a set of target registers to hold the official state of the target processor for which the target application was originally created. The target registers are connected to their working register equivalents through a dedicated interface that allows a commit operation to quickly transfer the content of all working registers to official target registers and allows an operation called "rollback" to quickly transfer the content of all official target registers back to their working register equivalents.

The additional official registers and the gated store buffer allow the state of memory and the state of the target registers to be updated together once one or a group of target instructions have been translated and run without error. Updates are chosen by the code morphing software to occur on integral target instruction boundaries. If the primitive host instructions generated by a translation of a series of target instructions are run by the host processor without generating an exception, then the working memory stores and working register state generated by those instructions are transferred to official memory and to the official target registers.

On the other hand, if an exception occurs when processing the host instructions at a point which is not on a target instruction boundary, the original state in the target registers at the last update (or commit) may be recalled to the working registers and uncommitted memory stores in the gated store buffer may be discarded. Then, if the exception generated is a target exception, the target instructions causing the target exception may be retranslated one at a time and executed in serial sequence as they would be executed by a target microprocessor. As each target instruction is correctly executed without error, the state of the target registers may be updated; and the data in the store buffer gated to memory. Then, when the exception occurs again in running the host instructions, the correct state of the target processor is held by the target registers of the morph host and memory; and the operation may be correctly handled without delay. Each new translation generated by this corrective translating may be cached for future use as it is translated or alternatively discarded if caused by a one time or rare occurrence such as a page fault. These features combine to assist the microprocessor created by the combination of the code morphing software and the morph host to execute instructions more rapidly than processors for which the software was originally written.

In addition to simply translating the instructions, caching the translated instructions, and executing each translation whenever that set of instructions needs to be executed, the code morphing software also reorders, optimizes, and reschedules the different translations. One optimizing process links the various sequences of translated host instructions to one another as the probable branches to be taken become apparent during execution. Eventually, the main loop references in the branch instructions of host instructions are almost completely eliminated. When this condition is reached, the time required to fetch target instructions, decode target instructions, fetch the primitive instructions which make up the target instructions, optimize those primitive operations, reorder the primitive operations, and reschedule those primitive operations before running any host instruction is eliminated. Thus, the work required to run any set of target instructions using the improved microprocessor is drastically reduced.

As pointed out above, the operation of reordering utilizes a scheduler which attempts to choose a better order for instructions to execute when presented correctly but naively ordered instructions. A problem with schedulers is that they function with a number of constraints. The most basic constraint is that the program must still produce the same ultimate result when executing as did the original sequence of instructions. All of these constraints cause a typical scheduler to function very conservatively and, consequently, produce code which executes slowly.

For example, to ensure that a correct result is produced, the typical scheduler operates upon a deterministic basis to select those instructions which have no dependencies, those instructions which have dependencies, and those instructions about which the presence of dependencies is unknown. Those instructions which have dependencies and those about which the presence of dependencies is unknown are all treated as though dependencies exist and are not reordered. Only those instructions known to be without dependencies are reordered. Following these guidelines, schedulers produce code which executes slowly.

Another constraint relates to a particular embodiment of the morph host processor. One embodiment of the morph host processor is a processor which is designed to function rapidly by eliminating specialized circuitry which slows operations. This embodiment of the morph host processor is designed without any hardware locking mechanism. A hardware locking mechanism is a circuit intended to assure that all steps in a particular sequence of instructions are executed without being interrupted. The lack of a locking mechanism requires a scheduler to function very strictly to assure that all steps in such sequences are handled in the originally translated order without any reordering so that the processor will produce the correct result from the sequence.

The scheduler according to one embodiment is a software portion of the code morphing software. Unlike hardware schedulers of the prior art, the software scheduler uses speculative techniques in reordering instructions. The scheduler speculates that for certain operations the fastest possible operation is desired and reorders instructions to accomplish this result. Hardware is provided in the morph host to raise an exception if the speculation chosen is incorrect. In most cases, the speculation is correct, so the overall result is much faster operation. However, if the speculation is incorrect, then the exception typically causes the software to utilize the gated store buffer and the target registers to roll back operations to the beginning of the speculative sequence at which correct state is known.

Figure 6:
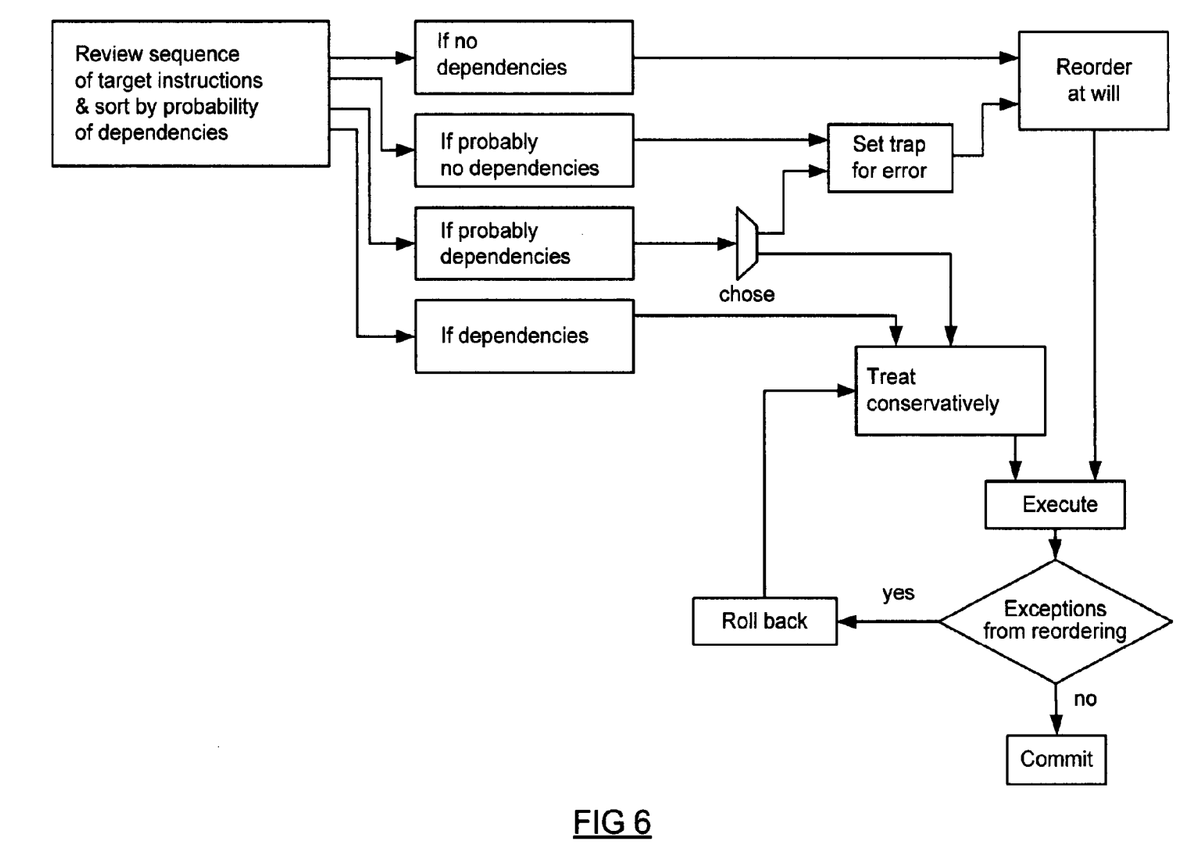
FIG. 6 is a flow chart illustrating the operation of scheduler software designed in accordance with an embodiment.

In contrast to the deterministic strategy used by prior art schedulers, the scheduler according to an embodiment utilizes probabilistic guidelines in selecting categories of instructions for reordering. The improved scheduler selects four categories of sequences of instructions (see FIG. 6) from the sequences of instructions produced by translation from a set of target instructions. These categories include sequences of instructions with no dependencies, sequences of instructions with known dependencies, sequences of instructions which probably have no dependencies, and sequences of instructions which probably have dependencies. As with the prior art, those sequences of instructions known to have no dependencies may be reordered at will by the scheduler; and those sequences of instructions with known dependencies are handled in the sequential order provided by the translator.

However, the instructions which probably have no dependencies are treated as though they in fact have no dependencies and are reordered in a manner to provide the fastest possible execution. Hardware means are provided in the morph host to detect an incorrect reordering and raise an exception if dependencies in fact exist. The scheduler cooperates with the hardware means to ensure that a check is enabled for each reordered instruction which may execute incorrectly in order to raise an exception when the sequence of operations does execute incorrectly. Such an exception allows the scheduler to ignore its previous reordering which raised the exception and treat the sequence conservatively or in some other more appropriate manner.

Those instructions which probably have dependencies, on the other hand, may be handled either aggressively or conservatively. If handled aggressively, they are treated as are those instructions which probably have no dependencies. They are reordered in a manner to provide the fastest possible execution and use the hardware means provided in the morph host to detect and raise an exception if incorrect reordering has taken place. If handled conservatively, they are handled in the sequential order provided by the translator. Normally, the conservative treatment will provide faster processing because the raising of a large number of exceptions noticeably slows execution speed.

Figure 7:
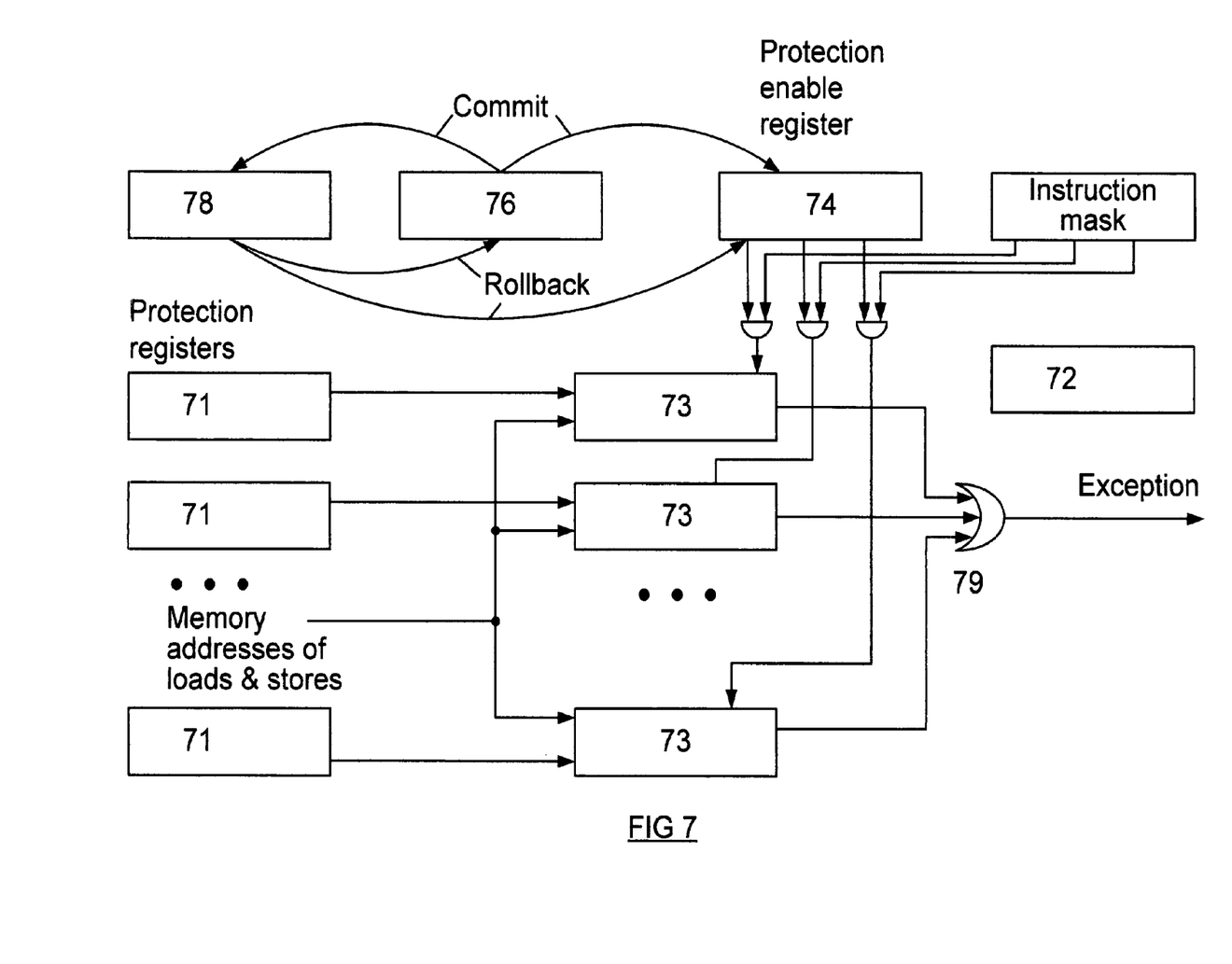
FIG. 7 is a block diagram illustrating one embodiment of circuitry for practicing embodiments of the disclosure.

In one embodiment, circuitry such as that illustrated in FIG. 7 is added to the host processor. This circuitry is utilized to store a memory address accessed by an instruction which has been reordered by the scheduler using a special "load and protect" or "store and protect" operation. Such a "load and protect" or "store and protect" operation is used whenever an instruction has been reordered and has the effect of placing the memory address accessed by the reordered instruction in one of a plurality of registers 71 of the morph host designated for use as protection registers. In one embodiment, eight protection registers 71 are provided. The "load and protect" or "store and protect" instruction indicates the particular protection register which is to be used for the operation.

Although the term "memory address" is used throughout this specification in explaining the load and protect and store and protect instructions, the term is used as a reference to a number of possible arrangements for determining a memory region which is protected. The term memory address is used to mean a descriptor of a memory region which is being protected. For example, in a system in which memory is byte addressable, one embodiment uses a starting memory address and a number of bits equal to the number of bytes within the address region to indicate the protected condition of each of those bytes. Another embodiment with similar addressing utilizes a starting memory address and a length, while a third embodiment utilizes individual byte addresses and individual comparators for each byte address.

In an exemplary operation a sequence of instructions includes in order a first store instruction STORE1, a second store instruction STORE2, and a load instruction LOAD1. The scheduler decides to reorder the instructions to place the load instruction first, the second store instruction second, and the first store instruction third in the reordered sequence on the assumption that the reordering probably will not cause an incorrect operation. To do this, the scheduler uses the "load and protect" operation to place the load data in one of the general registers 72 and the address of the memory position from which the load data was derived in the protection register 71 designated by the instruction. Because the software scheduler understands which instructions need be checked to determine whether the reordering has caused an error, the scheduler places an indication (e.g., a bit in a bitmask) in those next instructions which may be affected by the reordering (in this case, the STORE1 and STORE2 instructions ahead of which the load was placed) to indicate the particular protection register holding the protected memory address. The presence of this indication in a particular position (one of eight bits if eight protection registers are used for the trapping function) indicates that the execution of the instruction depends on whether the address in which each store is to be placed by the store instruction overlaps the memory address held in the indicated protection register 71.

Similarly, the scheduler uses a "store and protect" operation to store the data of the STORE2 instruction in memory and to place the address of the memory position to which the data was stored in the protection register 71 designated by the store and protect instruction. The scheduler also places an indication in the bitmasks of each of the instructions which may be affected by the reordering (in this case, the STORE1 instruction only) to indicate the particular protection register holding this protected memory address. Finally, the scheduler uses a normal store instruction for the last STORE1 instruction.

As the sequence of instructions is executed, the host hardware uses comparator circuitry 73 to determine for each of these three instructions if the memory address of the instruction overlaps any portion of the data at a memory address stored in one of the protection registers 71 and, if so, raises an exception. Thus, the LOAD1 operation (which has become a load and protect) writes its memory to a protection register 71 but does not check any protection registers since none have been designated by indicators being set. The STORE2 operation (which has become a store and protect) writes its memory position to a different protection register 71 and checks the protection register 71 used for the LOAD1 instruction to determine overlap between their memory positions. Finally, the STORE1 operation (which remains a simple store although augmented by the protection register indicators) checks the protection registers for each of the LOAD1 and STORE2 instructions for overlap between its memory address and the memory addresses of the LOAD1 and STORE2 instructions. In the case of the first and third embodiments described above, the comparison allows protection to be precisely applied to the byte level.

Any exception causes the code morphing software to determine the steps to be taken in response to the exception. Typically, the code morphing software causes the execution of the reordered sequence of instructions to be aborted and the host to revert to the state of the target processor at the beginning of the sequence of instructions so that the sequence of instructions may be reprocessed conservatively. If the addresses are not the same (indicating in the example that the store instruction does not access the protected memory address), the execution of the reordered sequence of instructions proceeds at the accelerated pace provided by the reordering.

In order to implement communications between the host processor and the scheduler, the load and store instructions utilized by the morph host have been modified. In one embodiment, these instructions are completely replaced by the "load and protect" and "store and protect" instructions. Each "load and protect" and each "store and protect" instruction includes a bitmask (e.g., eight bits corresponding to eight protection registers) the bits of which are used as flags to indicate a particular protection register in which to look for the memory address of the reordered or aliased instruction. Each of these bits designates one of the available protection registers in which the memory addresses are to be stored for the hardware to check. With this bitmask, the specific protection register designated to store the memory address when the instruction is reordered may be checked before the subsequent instruction which may be affected by the reordering is executed. The "load and protect" and "store and protect" instructions may be used in place of the normal load and store instructions, respectively, because when no bits of the bitmask are set, no checking will occur. In such a case, "load and protect" and a "store and protect" operations are identical to load and store operations. It should also be noted that the ability to associate protection registers with particular general registers holding memory data allows efficient use of a small number of protection registers.

The host processor according to an embodiment also includes an additional register called an enable protection register 74 to store the positions of the protection registers which contain valid memory addresses related to reordered instructions. The bits indicating particular protection registers are set to indicate the protection registers using the indication provided by the "load and protect" or "store and protect" instructions. In one embodiment, the bits of the enable protection register are cleared whenever a commit operation occurs indicating that a sequence of translated and reordered instructions has executed without raising a reordering exception. Since reordering only takes place in sequences of instructions all of which occur between two commit points, this allows the reordering operation to utilize all of the protection registers allotted to reordering for each newly translated sequence of instructions.

An additional advantage of embodiments is that the "store and protect" operation allows reordering of stores with respect to one another. In an embodiment, this may be accomplished by storing data to a memory position and protecting the address of the memory position in a protection register. When the subsequent store which may be affected by the reordering occurs, its bitmask indicates the protection register which the hardware should check for a memory address to determine if an exception should be raised or if the reordering of stores has been accomplished correctly.

In one embodiment of the new microprocessor, a circuit arrangement has been provided that allows memory data used quite often in the execution of an operation to be replicated (or "aliased") in an execution unit register in order to eliminate the time required to fetch the data from or store the data to memory. For example, if data in memory is reused frequently during the execution of one or more code sequences, the data must typically be retrieved from memory and loaded to a register in an execution unit each time the data is used. To reduce the time required by such frequent memory accesses, the data may instead be loaded once from memory to an execution unit register at the beginning of the code sequence and the register designated to function in place of the memory space during the period in which the code sequence continues. Once this has been accomplished, each of the load operations which would normally involve loading data to a register from the designated memory address becomes instead a simple register-to-register copy operation which proceeds at a much faster pace; and even those copy operations may frequently be eliminated by further optimization.

Similarly, execution of a code sequence often requires that data be written to a memory address frequently during the execution of a code sequence. To reduce the time required by such frequent memory stores to the same address, each time the data is to be written to the memory address, it may be transferred to an execution unit register which is designated to function in place of the memory space during the period in which the code sequence is continuing. Once an execution unit register has been designated, each change to the data requires only a simple register-to-register transfer operation which proceeds much faster than storing to a memory address.

The operation of the aliasing circuitry is described in U.S. Pat. No. 5,926,832, filed Sep. 26, 1996, entitled Method and Apparatus for Aliasing Memory Data in an Advanced Microprocessor, M. Wing et al, and assigned to the assignee of the present application.

A second embodiment for accelerating reordered operations utilizes certain additional hardware so that the same hardware may be used both for reordering and for aliasing of memory addresses in the manner described in the above-mentioned patent application. It should be noted that reordering instructions typically occurs in intervals between adjacent commit operations while aliasing memory data in an execution unit register typically remains in effect for much longer periods. In this second embodiment, a second "persistent" register 76 is added to allow long term or persistent protection to be utilized along with the short term protection provided for reordering by the enable protection register 74. The second persistent register 76 is used in the same manner as the register 74 but to record only those protection registers in which memory addresses should be maintained for periods longer than between adjacent commit operations.

For example, if it is desired to alias a memory address and store the data in a host register to be used for some long period (e.g., during a loop), the indication of which protection register is holding the address of the long term aliasing operation is copied from the instruction and is placed in both the enable protection register 74 and the second persistent register 76. Presuming that the sequence of reordered instructions executes without raising an exception thereby allowing a first commit operation to occur, then the enable protection register is cleared. In this manner, the short term flags indicating the protection registers holding the addresses of reordered instructions to check are eliminated at each commit. After the enable protection register is cleared at the commit, the contents of the second persistent register are written into the enable protection register. Since the data in the persistent register indicating which protection registers are being used for long term aliasing is written to the enable protection register, the indications of the protection registers used for long term aliasing are not affected by the commit operation. By writing the contents of the persistent register to the enable protection register at each commit, protection is effectively continued for the next sequence of instructions and, ultimately, until the second register is finally cleared when the data is no longer needed for the aliasing operation.

In addition to the second persistent register 76, a shadow register 78 is kept which stores the information also kept in the persistent register. The shadow register is used during commit and rollback operations. When a commit occurs, the data in the persistent register 76 is copied in the manner discussed above to the enable protection register 74. The same data is also copied on a commit to the register 78 shadowing the persistent register so that the shadow register contains the settings for the persistent register at the start of the next sequence of instructions which may be reordered. If an exception occurs during the execution of the next sequence of instructions and a rollback operation is necessary, then the contents of the shadow register are copied to both the enable protection register and the persistent register. This places the same indications in the enable protection and persistent registers as was in those registers before the execution of the sequence of instructions began thereby assuring correct state for the more conservative execution which follows.

Additional advantages are provided by the arrangement in accordance with embodiments. While the addition of the persistent register 76 allows the use of the same hardware for both enhancing the ability to reorder during the short term (between commits) and to maintain aliased memory data for long periods in execution unit registers thereby eliminating memory accessing redundancies, it may also be used to eliminate other types of redundancies which occur between commit operations. For example, it is possible that two loads from the same memory address may occur during a sequence of instructions. If this happens and there are no intervening stores to the memory address, then the second load may be simply ignored; and the data placed in a register by the first memory access used without change in place of the second load operation. However, if a store intervenes between the loads, it is necessary to determine whether the store occurred to the memory address from which the second access is to occur. Thus, prior art optimization techniques would not be able to eliminate the second load if a store intervened between the loads.

In order to shorten the operation, embodiments may be used to advantage. If the first load is changed to a "load and protect" operation with the memory address stored in a protection register and the store instruction receives a flag to indicate the particular protection register to check, then the second load may be eliminated and the data stored by the "load and protect" operation used for the second load. If the store instruction attempts to access the protected memory address, the flag indicating the protection register to check will cause a comparison to take place before the store access occurs. This will generate an exception, and a rollback to the last commit point at which correct target state exists will occur. The scheduler may then provide the appropriate instruction sequence including the second load operation and the sequence may be reexecuted.

Similarly, if a sequence of instructions between two commit operations includes two stores to the same memory address, the first store may be eliminated if no load from the memory address has occurred between the stores. However, if data from the memory address has been used for a load in the interim, then the first store may not be eliminated. Using embodiments, the first store to the memory address may be eliminated if the load instruction is made a "load and protect." Then the second store receives the protection register indication from the "load and protect" to check the memory address of the access. If the load is from a different address, then the second store may proceed correctly. If the load is from the same address, then the attempt to access memory for the second store will generate an exception which will roll back the operation to the last commit point. From that point the scheduler may reschedule the instructions to include both store operations and reexecute the sequence.

The foregoing descriptions of specific embodiments have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the claims appended hereto and their equivalents.

What is claimed is:

1. An apparatus comprising:
a processor operable to execute a reordered sequence of instructions, wherein the reordered sequence of instructions includes a first instruction and a second instruction to be changed from being executable after the first instruction to being executable prior to the first instruction;
a register operable to store, if the second instruction is executed, a first memory address range accessed by the second instruction, wherein the register is unusable by the reordered sequence of instructions, and wherein the first instruction includes information that indicates in a bitmask of the first instruction, which is affected by the reordering, to identify the register; and
a comparator coupled to the register, wherein the comparator is operable to compare the first memory address range with a second memory address range accessed by the first instruction to determine an overlap responsive to an enable signal, wherein if the comparator determines the first memory address range overlaps the second memory address range, an exception is triggered.

2. The apparatus of claim 1, wherein at least one of the first instruction and the second instruction is a store instruction.

3. The apparatus of claim 1, wherein at least one of the first instruction and the second instruction is a load instruction.

4. The apparatus of claim 1, further comprising an exception handler.

5. The apparatus of claim 1, wherein the reordered sequence of instructions comprises a plurality of instructions translated from a plurality of source instructions.

6. The apparatus of claim 1, wherein the information enables a comparison result from the comparator.

7. An apparatus comprising:
a processor operable to execute a modified sequence of instructions, wherein the modified sequence of instructions includes a first instruction, wherein the modified sequence of instructions are operable to omit a second instruction of an unmodified sequence of instructions including the first instruction and the second instruction;
a register operable to store a first memory address range associated with the second instruction, wherein the register is unusable by the modified sequence of instructions, and wherein the first instruction includes information that indicates in a bitmask of the first instruction, which is affected by the omission of the second instruction, to identify the register; and
a comparator coupled to the register, wherein the comparator is operable to compare the first memory address range with a second memory address range accessed by the first instruction to determine an overlap responsive to an enable signal, wherein if the comparator determines the first memory address range overlaps the second memory address range, an exception is triggered.

8. The apparatus of claim 7, wherein at least one of the first instruction and the second instruction is a store instruction.

9. The apparatus of claim 7, wherein at least one of the first instruction and the second instruction is a load instruction.

10. The apparatus of claim 7, further comprising an exception handler.

11. The apparatus of claim 7, wherein the modified sequence of instructions comprises a plurality of instructions translated from a plurality of source instructions.

12. The apparatus of claim 7, wherein the information enables a comparison result from the comparator.

13. An apparatus comprising:
means for executing a reordered sequence of instructions, wherein the reordered sequence of instructions includes a first instruction and a second instruction to be changed from being executable after the first instruction to being executable prior to the first instruction;
means for storing, if the second instruction is executed, a first memory address range accessed by the second instruction, wherein the means for storing is unused by the reordered sequence of instructions, and wherein the first instruction includes information that indicates in a bitmask of the first instruction, which is affected by the reordering, to identify the means for storing; and
means for comparing the first memory address range with a second memory address range accessed by the first instruction to determine an overlap responsive to an enable signal, wherein the means for comparing is coupled to the means for storing, wherein if the means for comparing determines the first memory address range overlaps the second memory address range, an exception is triggered.

14. The apparatus of claim 13, wherein at least one of the first instruction and the second instruction is a store instruction.

15. The apparatus of claim 13, wherein at least one of the first instruction and the second instruction is a load instruction.

16. The apparatus of claim 13, wherein the reordered sequence of instructions comprises a plurality of instructions translated from a plurality of source instructions.

17. The apparatus of claim 13, wherein the information enables a result from the means for comparing.

* * * * *